United States Patent
Shalita et al.

(10) Patent No.: US 8,625,413 B2
(45) Date of Patent: Jan. 7, 2014

(54) FAULT TOLERANT MODE FOR 100BASET ETHERNET

(75) Inventors: Oren Shalita, Tel-Aviv (IL); Shlomy Chaikin, Moshav Mazor (IL)

(73) Assignee: Texas Instruments Incorporated, Dallas, TX (US)

( * ) Notice: Subject to any disclaimer, the term of this patent is extended or adjusted under 35 U.S.C. 154(b) by 775 days.

(21) Appl. No.: 12/704,224

(22) Filed: Feb. 11, 2010

(65) Prior Publication Data

US 2011/0194408 A1 Aug. 11, 2011

(51) Int. Cl.
*G01R 31/08* (2006.01)

(52) U.S. Cl.
USPC .......... 370/228; 370/216; 370/225; 370/276; 370/296

(58) Field of Classification Search
USPC ......... 370/216, 217, 218, 219, 220, 221, 222, 370/223, 224, 225, 226, 227, 228
See application file for complete search history.

(56) References Cited

U.S. PATENT DOCUMENTS

| | | | | |
|---|---|---|---|---|
| 5,623,513 A * | 4/1997 | Chow et al. | ................... | 375/219 |
| 7,587,181 B2 | 9/2009 | Cheung et al. | | |
| 2004/0090981 A1 * | 5/2004 | Lin et al. | ....................... | 370/445 |
| 2004/0213170 A1 | 10/2004 | Bremer | | |
| 2005/0021734 A1 * | 1/2005 | Chan | ............................ | 709/224 |
| 2005/0099951 A1 * | 5/2005 | Mohan et al. | ................. | 370/241 |
| 2005/0135413 A1 | 6/2005 | Yang et al. | | |
| 2005/0281326 A1 * | 12/2005 | Yu | ................................. | 375/222 |
| 2006/0077888 A1 * | 4/2006 | Karam et al. | ................. | 370/216 |
| 2008/0253356 A1 | 10/2008 | Berman et al. | | |
| 2009/0225779 A1 * | 9/2009 | Diab et al. | .................... | 370/469 |
| 2009/0310483 A1 | 12/2009 | Okazaki | | |
| 2010/0169704 A1 * | 7/2010 | Yu et al. | ........................... | 714/2 |

OTHER PUBLICATIONS

PCT Search Report mailed Aug. 29, 2011.

* cited by examiner

*Primary Examiner* — Jason Mattis
*Assistant Examiner* — James P Duffy
(74) *Attorney, Agent, or Firm* — Alan A. R. Cooper; W. James Brady, III; Frederick J. Telecky, Jr.

(57) ABSTRACT

Today, 100BaseT is commonly used in industrial Ethernet application. As a result of being in such an environment, Ethernet cables are subject to abuse, which can result in costly failures and repairs. Here, a system is provided that enables use of remaining and largely undamaged twisted-pairs within Ethernet cables to maintain 100BaseT connections without costly repairs and failures.

10 Claims, 3 Drawing Sheets

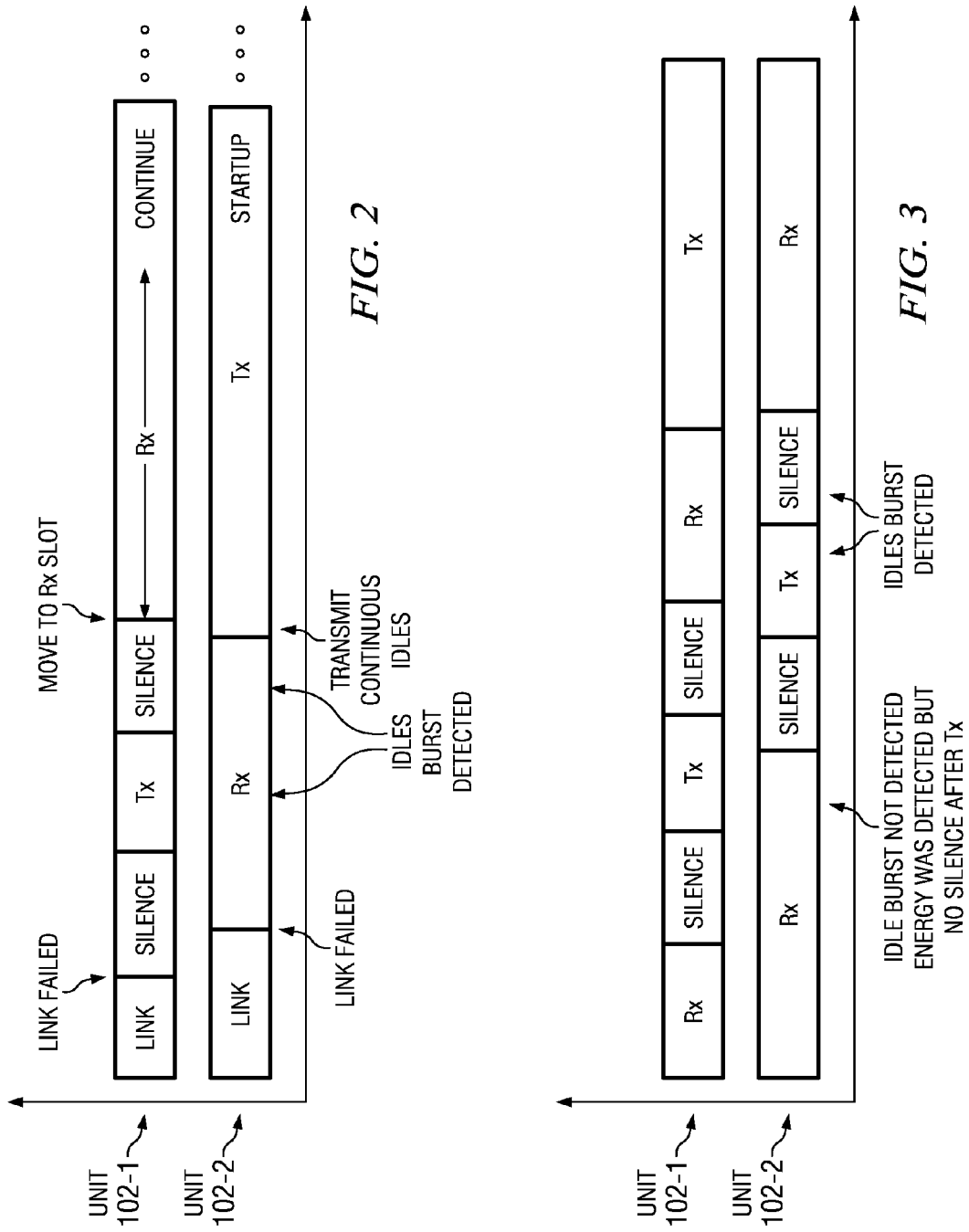

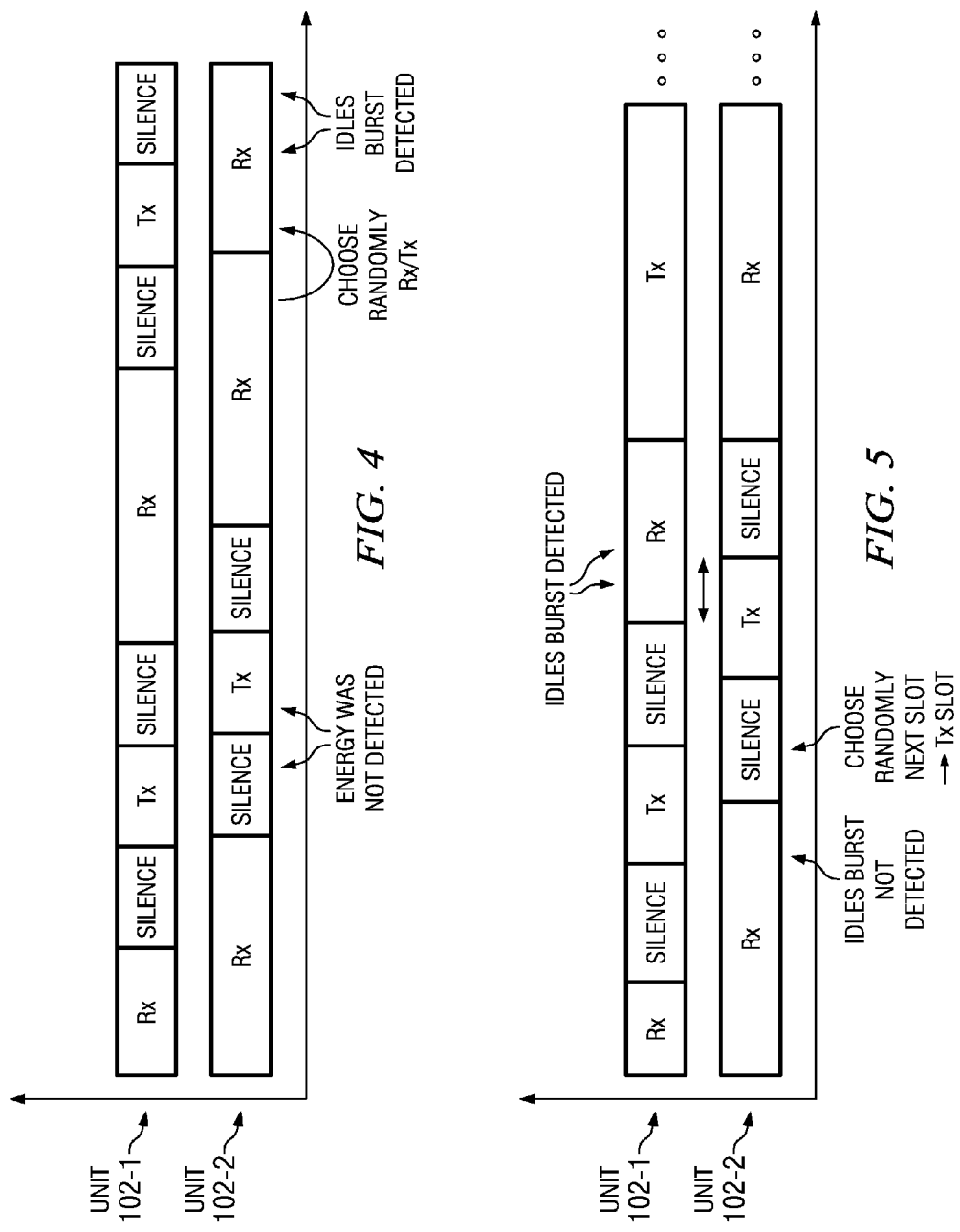

FAULT TOLERANT MODE FOR 100BASET ETHERNET

TECHNICAL FIELD

The invention relates generally to Ethernet and, more particularly, to a fault mode for 100BaseT Ethernet.

BACKGROUND

Currently, there are numerous Institute of Electrical and Electronics Engineers (IEEE) standards for Ethernet. Some examples are 10BaseT, 100BaseT, and 1000BaseT, which are enumerated and described for several different types of transmission media (i.e., twisted-pair). Specifically, though, 100BaseT for twisted-pairs (which is described by IEEE 802.3u and that is hereby incorporated by reference for all purposes) has largely fallen into disuse in favor of higher speed standards (i.e., 1000BaseT) with exception to many industrial applications. In other words, 100BaseT is still widely used for industrial Ethernet.

Because of the limited and relatively small market for 100BaseT, there has been very little development, even though there are problems that exist. For example, Ethernet cables to subject to substantial abuse in an industrial environment, meaning that there is a high likelihood of damage to the cables. Moreover, disruptions in Ethernet function and replacement of these cables can each be very costly. Thus, there is a need for a system that operates over 100BaseT connections that is tolerant of cable damage.

Some examples of conventional systems are: U.S. Pat. No. 7,587,181; U.S. Patent Pre-Grant Publ. No. 2004/0213170; and U.S. Patent Pre-Grant Publ. No. 2008/0253356.

SUMMARY

A preferred embodiment of the present invention, accordingly, provides an apparatus. The apparatus comprises a transmission path; a receive path; a digital-to-analog converter (DAC) that is coupled to the transmission path; an analog-to-digital converter (ADC) that is coupled to the receive path; and a medium dependent interface (MDI) that is coupled to the DAC and the ADC, wherein the MDI is adapted to receive a first twisted-pair and a second twisted-pair so as to provide communication over a 100BaseT connection, and wherein the MDI enters a fault tolerance mode when a fault in one of the first and second twisted-pairs has been detected, and wherein, in the fault tolerance mode, a full-duplex 100BaseT link is created over an active twisted-pair, and wherein the active twisted-pair is one of the first and second twisted-pair without the fault.

In accordance with a preferred embodiment of the present invention, the MDI is a medium dependent interface crossbar (MDIX).

In accordance with a preferred embodiment of the present invention, the apparatus further comprises: an echo canceller that is coupled to the transmission path and the receive path; and a hybrid circuit that is coupled to the DAC and the ADC.

In accordance with a preferred embodiment of the present invention, the MDI detects whether one of the first and second twisted-pairs has the fault by determining if a half/full-duplex 100BaseT link fails within a predetermined period.

In accordance with a preferred embodiment of the present invention, the MDI performs synchronization over the active twisted-pair in the fault tolerant mode.

In accordance with a preferred embodiment of the present invention, a method is provided. The method comprises detecting whether a fault is preset in one of a first twisted-pair and a second twisted-pair that are coupled between a first unit and a second unit; determining which of one of the first and second twisted-pairs is an active twisted-pair; and establishing a half/full duplex 100BaseT link over the active twisted-pair.

In accordance with a preferred embodiment of the present invention, the step of detecting further comprises detecting whether one of the first and second twisted-pairs has a fault by determining if a half-duplex 100BaseT link fails within a predetermined period.

In accordance with a preferred embodiment of the present invention, the method further comprises: configuring the first and second units as a master unit and a slave unit; and synchronizing the master and slave units.

In accordance with a preferred embodiment of the present invention, the step of configuring further comprises: randomly entering into one of a transmission time slot and a receive time slot by each of the first and second units; for the transmission time slot, remaining silent by at least one of the first and second units for a first portion of the transmission time slot; for the transmission time slot, transmitting a signal at least one of the first and second units for a second portion of the transmission time slot, wherein the second portion of the transmission time slot follows the first portion of the transmission time slot; for the transmission time slot, remaining silent at least one of the first and second units for a third portion of the transmission time slot; for the receive time slot, detecting an idle burst at least one of the first and second units; defining a minimal time period of detected transmitted idles on a receive path in order to declare identification of idle burst less than half of the transmitted period of the transmission time slot; and setting a master unit as one of the first and second units that detects the idle burst first.

In accordance with a preferred embodiment of the present invention, the step of establishing further comprises: transmitting a set of continuous idles with by a transmission path of the master unit; training an echo canceller of the master unit; and training an equalizer of the slave unit.

In accordance with a preferred embodiment of the present invention, the step of establishing further comprises training at least a portion of the slave unit; transmitting a set of continuous idles with by a transmission path of the slave unit after the step of training at least a portion of the slave unit; training an echo canceller of the slave unit; and training at least a portion of the master unit.

In accordance with a preferred embodiment of the present invention, an apparatus is provided. The apparatus comprises a first unit having: a first transmission path; a first receive path; a first DAC that is coupled to the transmission path; a first ADC that is coupled to the receive path; and a first MDI that is coupled to the first ADC and the first DAC; a first twisted-pair that is coupled to the first MDI; a second twisted-pair that is coupled to the first MDI; a second unit having: a second transmission path; a second receive path; a second DAC that is coupled to the transmission path; a second ADC that is coupled to the receive path; and a second MDI that is coupled to the second DAC and the second ADC, wherein the second MDI is coupled to the first and second twisted-pairs so as to provide communication over a 100BaseT connection with the first unit, and wherein the first and second MDIs enter a fault tolerance mode when a fault in one of the first and second twisted-pairs has been detected, and wherein, in the fault tolerance mode, a full-duplex 100BaseT link is created over an active twisted-pair, and wherein the active twisted-air is one of the first and second twisted-pair without the fault.

In accordance with a preferred embodiment of the present invention, each of the first and second MDIs further comprises a first MDIX and a second MDIX, respectively.

In accordance with a preferred embodiment of the present invention, the first unit further comprises: a first echo canceller that is coupled to the first transmission path and the first receive path; and a first hybrid circuit that is coupled to the first DAC and the first ADC.

In accordance with a preferred embodiment of the present invention, the second unit further comprises: a second echo canceller that is coupled to the second transmission path and the second receive path; and a second hybrid circuit that is coupled to the second DAC and the second ADC.

In accordance with a preferred embodiment of the present invention, the MDI detects whether one of the first and second twisted-pairs has the fault by determining if a half/full-duplex 100BaseT link fails within a predetermined period.

In accordance with a preferred embodiment of the present invention, the first and second MDIs configure the first and second units as a master unit and a slave unit and synchronize the master and slave units.

In accordance with a preferred embodiment of the present invention, each of the first and second MDIs set the master unit as one of the first and second units that detects an idle burst first.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 2-4 are timing diagrams illustrating resolution of master and slave units for the system of FIG. 1.

DETAILED DESCRIPTION

Figure 1:
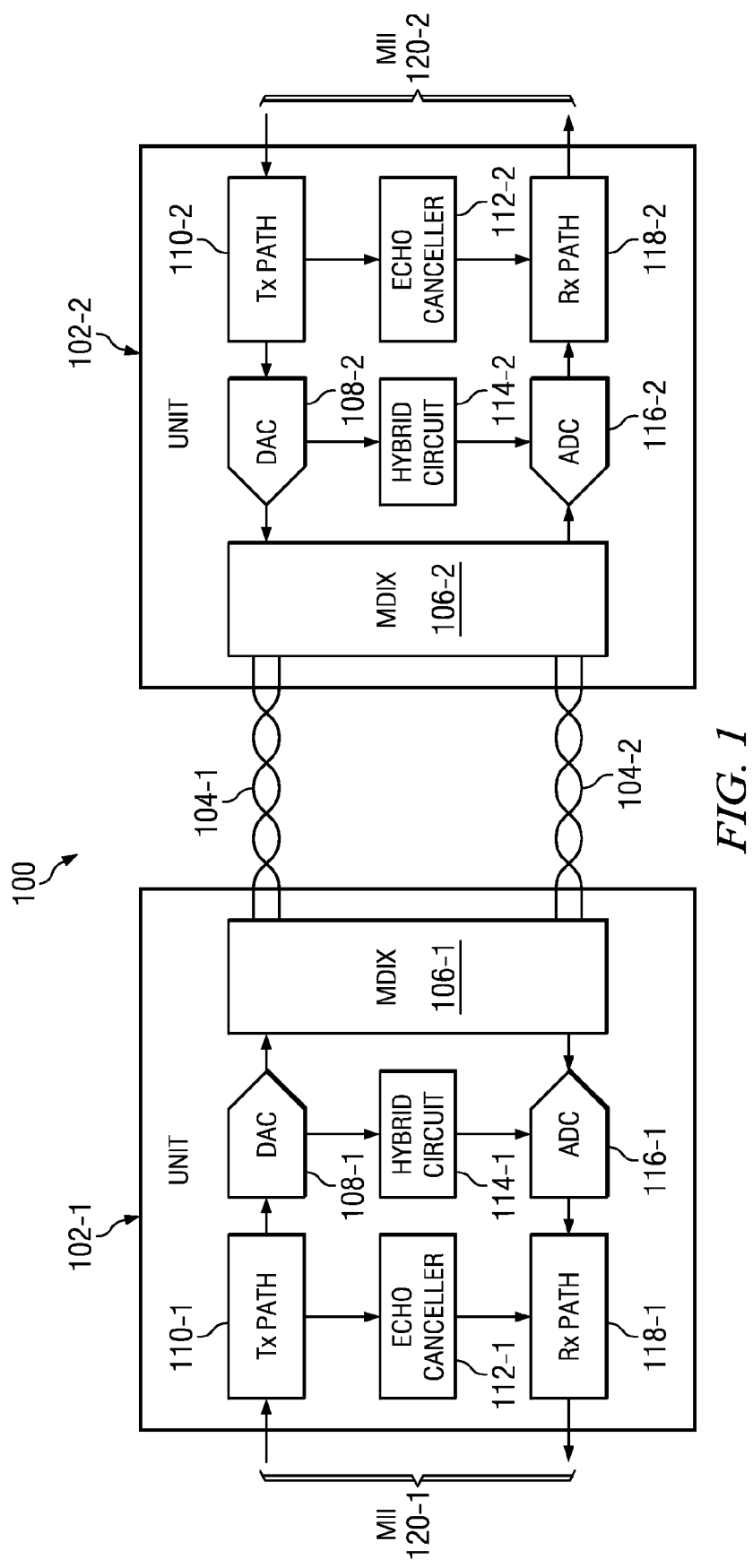
FIG. 1 is a block diagram of an example of a system in accordance with a preferred embodiment of the present invention.

Refer now to the drawings wherein depicted elements are, for the sake of clarity, not necessarily shown to scale and wherein like or similar elements are designated by the same reference numeral through the several views.

Referring to FIG. 1 of the drawings, the reference numeral 100 generally designates an example of a system in accordance with a preferred embodiment of the present invention. System 100 is generally an Ethernet system having units 102-1 and 102-2 that communicate with one another over twisted-pairs 104-1 and 104-2 via a 100BaseT connection. Typically, twisted pairs 104-1 and 104-2 can be category 5 or CAT5 cables. As a result of this 100BaseT connection, 100BaseT links over twisted-pairs 104-1 and 104-2 are physical half-duplex links under normal operation. The units 102-1 and 102-2 also generally communicate with their respective media independent interfaces (MIIs) 120-1 and 120-2.

Each of these units 102-1 and 102-2 includes a several subcomponents (which may be included on a single integrated circuit or IC) that enable the 100BaseT physical layer (PHY) to reestablish a 100BaseT link when a fault occurs using a fault tolerance mode. In particular, the units 102-1 and 102-2 respectively comprise medium dependent interfaces (MDIs) or medium dependent interface crossbars (MDIXs) 106-1 and 106-2, digital-to-analog converter (DACs) 108-1, transmission or TX paths 110-1 and 110-2, echo canceller 112-1 and 112-2, hybrid circuit 114-1 and 114-2, analog-to-digital converters (ADCs) 116-1 and 116-2, receive or RX paths 118-1 and 118-2. Optionally, hybrid circuits 114-1 and 114-2 can be omitted for applications where the lengths of twisted-pairs 104-1 and 104-2 are short (typically less than 10 m) because the relative strength of transmitted signals are much larger than the echo.

In operation, the system 100 can employ a fault tolerant mode to maintain a 100BaseT link, even if there is a fault in one of the twisted-pairs 104-1 and 104-2. Examples of faults are breaks and reduced signal-to-noise ratios (SNRs). Alternatively, the fault may be a choice by a user to use of the twisted-pairs 104-1 and 104-2 as a backup. The system 100 generally does this by detecting a fault in one of the twisted-pairs 104-1 and 104-2 when operating with physical half-duplex 100BaseT links. Once the fault is detected, the system 100 can establish a full-duplex 100BaseT link over the remaining active twisted-pair (twisted-pair 104-1 or 104-2 without the fault).

Prior to establishing a full-duplex 100BaseT link over twisted-pair 104-1 or 104-2, there are several criteria that should be achieved. First, there should be a single clock for units 102-1 and 102-2 so as to generally maintain the echo response with constant phase delay compared to received data to allow for a simpler digital least mean square (LMS) and to generally operate the units 102-1 and 102-2 in a master/slave configuration. Second, the filters within units 102-1 and 102-2 should converge.

In order to comply with the IEEE standard (namely, IEEE 802.3u) for link establishment and to be able to enter the fault tolerance mode, the system 100 employs a link timer (having a predetermined period or duration that is typically on the order of a few milliseconds) to make measurements. Generally, during power-up or if a fault occurs, the link timer is started. Essentially, the link timer can be started each time a link failure occurs. During this period of the link timer, MDI 106-1 and/or 106-2 can attempt to reestablish a link. If a link cannot be established before the period lapses, MDI 106-1 and/or 106-2 assumes that there is a fault in one of the twisted-pairs 104-1 and 104-2 and the active twisted-pair is established.

Once the active twisted-pair 104-1 or 104-2 is established, then the system 100 configures the units 102-1 and 102-2 as a master unit and a slave unit. To do this, each of the units 102-1 and 102-2 (namely, the MDI's 106-1 and 106-2) first randomly enter into a transmission time slot or a receive time slot following the expiration of the link timer. For the transmission time slot, the MDI 106-1 and/or 106-2 transmits a signal generally in the middle of the transmission time slot, while remaining silent for the remainder of the transmission time slot. For the receive time slot, MDI 106-1 and/or 106-2 listens for an idle burst which is the energy received that corresponds to the signal transmitted from the other MDI 106-1 and/or 106-2 for the transmission time slot. The unit 102-1 or 102-2 for first MDI 106-1 or 106-2 to receive an idle burst is identified as master unit, while the other unit 102-1 or 102-2 is identified as the slave unit. Because each of the units 102-1 and 102-2 enter into a transmission time slot or a receive time slot randomly, an algorithm (which is described in timing diagrams of FIGS. 2-4) is employed to generally ensure that a master unit and a slave unit are identified.

Turning first to FIG. 2, one unit (unit 102-1, for example) enters a transmission time slot, while the other unit (unit 102-2, for example) enters a receive time slot. As shown, after the link failure, a signal is transmitted from unit 102-1 and is receives by unit 102-2 so that an idle burst is detected. Thus, for this case, unit 102-2 is identified as master unit, while unit 102-1 is identified as the slave unit.

Turning now to FIG. 3, both units 102-1 and 102-2 enters a receive time slot after the link failure. As shown, the timings for entering the receive time slots for units 102-1 and 102-2 are different, so each of the units 102-1 and 102-2 alternate between transmission time slots and receive time slots. For this case, unit 102-1 is identified as master unit, while unit 102-2 is identified as the slave unit after one alternation between transmission time slots and receive time slots for each of the units 102-1 and 102-2.

Turning to FIG. 4, both units 102-1 and 102-2 enters again a receive time slot after the link failure. A difference between FIG. 3 and FIG. 4, though, is that the neither of the units 102-1 nor 102-2 were identified as the master unit after two alternation, so after the second alternation, units 102-2 randomly enter one of the time slots, where an idle burst is detected so that unit 102-2 is identified as master unit and unit 102-1 is identified as the slave unit.

Finally, turning to FIG. 5 both units 102-1 and 102-2 enters again a receive time slot after the link failure. Here, however, there is a failure to detect the first idle burst by unit 102-2 because the idle burst is less than one-half of the period of transmission of the signal by unit 102-1. This failure causes unit 102-1 to randomly enter the transmission time slot, where unit 102-1 detects an idle burst due to the fact that the burst period will generally be more than twice the size of the defined period of time to detect a burst in the receive time slot. Thus, unit 102-1 is indentified as the master unit, while unit 102-2 is identified as the slave unit.

Following identification of the master unit and the slave unit, units 102-1 and 102-2 are synchronized. Continuous idle transmission (continuous signals transmitted form one unit 102-1 or 102-2 to the other) are received by the slave unit. Upon detection of the continuous idle transmission, the slave unit waits for a predetermined period (on the order of a few millisecond) for the echo canceller 112-1 or 112-2 of the master unit to converge, while doing so the salve train its equalizer (Intersymbol Interface or ISI cancellation).

With the master and slave units synchronized, the system enters into a startup phases. In a first startup phase, the transmission path 110-1 or 110-2 of the master unit provides continuous idle transmissions, while the echo canceller 112-1 or 112-2 of the master unit is trained. Additionally, in this first startup phase, the transmission path 110-1 or 110-2 of the slave unit remains silent, while portions of the slave unit (namely within the receive path 112-1 or 112-2) are trained (Equalizer). In a second startup phase, the transmission path 110-1 or 110-2 of the master unit provides continuous idle transmissions, while portions of the master unit (namely within the receive path 112-1 or 112-2 and MDI 106-1 or 106-2) are trained (Equalizer). Additionally, in this second startup phase, the transmission path 110-1 or 110-2 of the slave unit provides continuous idle transmissions, while the echo canceller 112-1 or 112-2 of the slave unit is trained. Additionally, in this second startup phase, the master unit trains the receive path 118-1 or 118-2 (Equalizer).

Therefore, with the fault tolerance mode, system 100 is able to provide a physical full-duplex 100BaseT link over one of the twisted-pairs 104-1 and 104-2 in the event of a fault or failure.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

We claim:

1. An apparatus comprising:

a transmission path;

a receive path;

a digital-to-analog converter (DAC) that is coupled to the transmission path;

an analog-to-digital converter (ADC) that is coupled to the receive path; and a medium dependent interface (MDI) that is coupled to the DAC and the ADC, wherein the MDI is adapted to receive a first twisted-pair and a second twisted-pair so as to provide communication over a 100BaseT connection, wherein the first twisted-pair and the second twisted-pair are used in half-duplex in a non-fault mode; and wherein the MDI enters a fault tolerance mode when a fault in one of the first and second twisted-pairs has been detected, and wherein, in the fault tolerance mode, a physical full-duplex 100BaseT link is created over an active twisted-pair previously used in the half-duplex in the non-fault mode, and wherein the active twisted-pair is one of the first and second twisted-pair without the fault, wherein the MDI detects whether one of the first and second twisted-pairs has the fault by determining if a half-duplex 100BaseT link fails within a predetermined period, wherein the MDI configures the apparatus as either a master unit or a slave unit and synchronizes the apparatus with a second apparatus that is a slave unit, wherein the MDIs can set the master unit to detect an idle burst first, the apparatus further comprising a first echo canceller that is coupled to the first transmission path and the first receive path; and a first hybrid circuit that is coupled to the DAC and the ADC.

2. The apparatus of claim 1, wherein the MDI is a medium dependent interface crossbar (MDIX).

3. The apparatus of claim 1, wherein the apparatus further comprises:

an echo canceller that is coupled to the transmission path and the receive path; and a hybrid circuit that is coupled to the DAC and the ADC.

4. The apparatus of claim 1, wherein the MDI detects whether one of the first and second twisted-pairs has the fault by determining if a half-duplex 100BaseT link fails within a predetermined period.

5. The apparatus of claim 4, wherein the MDI performs synchronization over the active twisted-pair in the fault tolerant mode.

6. A method comprising:
  detecting whether a fault is present in one of a first twisted-pair and a second twisted-pair that are coupled between a first unit and a second unit;
  determining which of one of the first and second twisted-pairs is an active twisted-pair wherein the first twisted-pair and the second twisted-pair are used in half-duplex in a non-fault mode; and
  establishing a full duplex 100BaseT link over the active twisted-pair previously used in the half-duplex in the non-fault mode,
  wherein the step of detecting further comprises
    detecting whether one of the first and second twisted-pairs has a fault by determining if a half/full-duplex 100BaseT link fails within a predetermined period;
    configuring the first and second units as a master unit and a slave unit; and
  synchronizing the master and slave units,
  wherein the step of configuring further comprises:
  randomly entering into one of a transmission time slot and a receive time slot by each of the first and second units;
  for the transmission time slot, remaining silent by at least one of the first and second units for a first portion of the transmission time slot;
  for the transmission time slot, transmitting a signal at least one of the first and second units for a second portion of the transmission time slot, wherein the second portion of the transmission time slot follows the first portion of the transmission time slot;
  for the transmission time slot, remaining silent at least one of the first and second units for a third portion of the transmission time slot, wherein the third portion of the transmission time slot follows the second portion of the transmission time slot;
  for the receive time slot, detecting an idle burst at least one of the first and second units;
  defining a minimal time period of detected transmitted idles on a receive path in order to declare identification of idle burst less than half of the transmitted period of the transmission time slot; and
  setting a master unit as one of the first and second units that detects the idle burst first.

7. The method of claim 6, wherein the step of establishing further comprises:
  transmitting a set of continuous idles with by a transmission path of the master unit;
  training an echo canceller of the master unit; and
  training at least a portion of the slave unit.

8. The method of claim 6, wherein the step of establishing further comprises:
  training at least a portion of the slave unit;
  transmitting a set of continuous idles with by a transmission path of the slave unit after the step of training at least a portion of the slave unit;
  training an echo canceller of the slave unit; and
  training at least a portion of the master unit.

9. An apparatus comprising:
  a first unit having:
    a first transmission path;
    a first receive path;
    a first DAC that is coupled to the transmission path;
    a first ADC that is coupled to the receive path; and
    a first MDI that is coupled to the first ADC and the first DAC;
  a first twisted-pair that is coupled to the first MDL,
  a second twisted-pair that is coupled to the first MDI;
    wherein the first twisted-pair and the second twisted-pair are used in half-duplex in a non-fault mode;
  a second unit having:
    a second transmission path;
    a second receive path;
    a second DAC that is coupled to the second transmission path;
    a second ADC that is coupled to the second receive path; and
    a second MDI that is coupled to the second DAC and the second ADC,
    wherein the second MDI is coupled to the first and second twisted-pairs so as to provide communication over a 100BaseT connection with the first unit, and
  wherein the first and second MDIs enter a fault tolerance mode when a fault in one of the first and second twisted-pairs has been detected, and
  wherein, in the fault tolerance mode, a physical full-duplex 100BaseT link is created over an active twisted-pair previously used in the half-duplex in the non-fault mode, and
  wherein the active twisted-pair is one of the first and second twisted-pair without the fault,
  wherein the first unit further comprises:
    a first echo canceller that is coupled to the first transmission path and the first receive path; and
    a first hybrid circuit that is coupled to the first DAC and the first ADC;
  a first echo canceller that is coupled to the first transmission path and the first receive path; and
  a first hybrid circuit that is coupled to the first DAC and the first ADC;
  wherein the second unit further comprises:
    a second echo canceller that is coupled to the second transmission path and the second receive path; and
    a second hybrid circuit that is coupled to the second DAC and the second ADC,
  wherein the MDI detects whether one of the first and second twisted-pairs has the fault by determining if a half-duplex 100BaseT link fails within a predetermined period,
  wherein the first and second MDIs configure the first and second units as a master unit and a slave unit and synchronize the master and slave units, and
  wherein each of the first and second MDIs set the master unit as one of the first and second units that detects an idle burst first.

10. The apparatus of claim 9, wherein each of the first and second MDIs further comprise a first MDIX and a second MDIX, respectively.

* * * * *